May 5, 1936.   W. W. WILLIAMS   2,039,469
LUBRICATING SYSTEM
Filed June 11, 1934    2 Sheets-Sheet 1
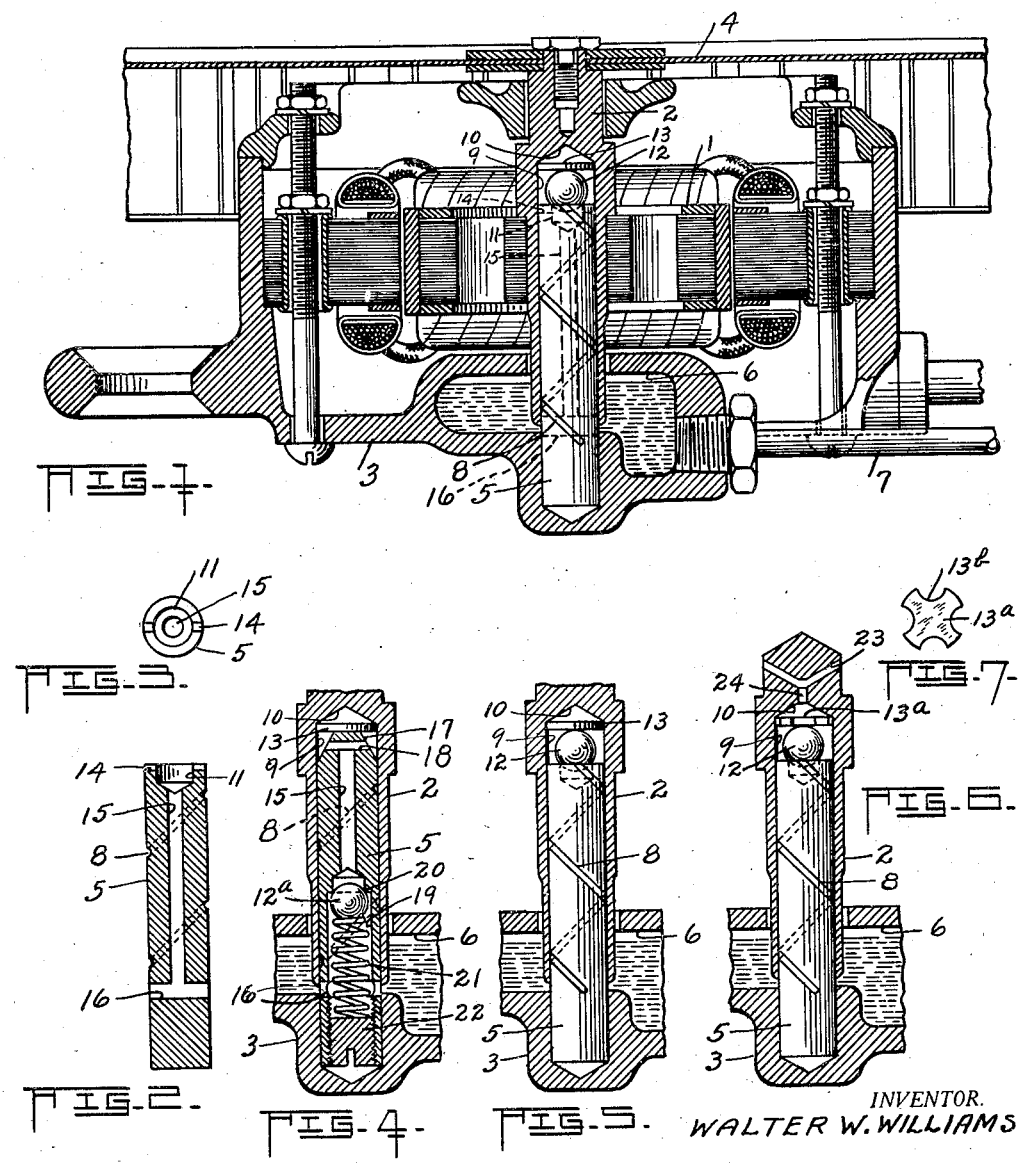
INVENTOR.
WALTER W. WILLIAMS
BY Laugan Mm
ATTORNEY.

May 5, 1936.    W. W. WILLIAMS    2,039,469
LUBRICATING SYSTEM
Filed June 11, 1934    2 Sheets-Sheet 2
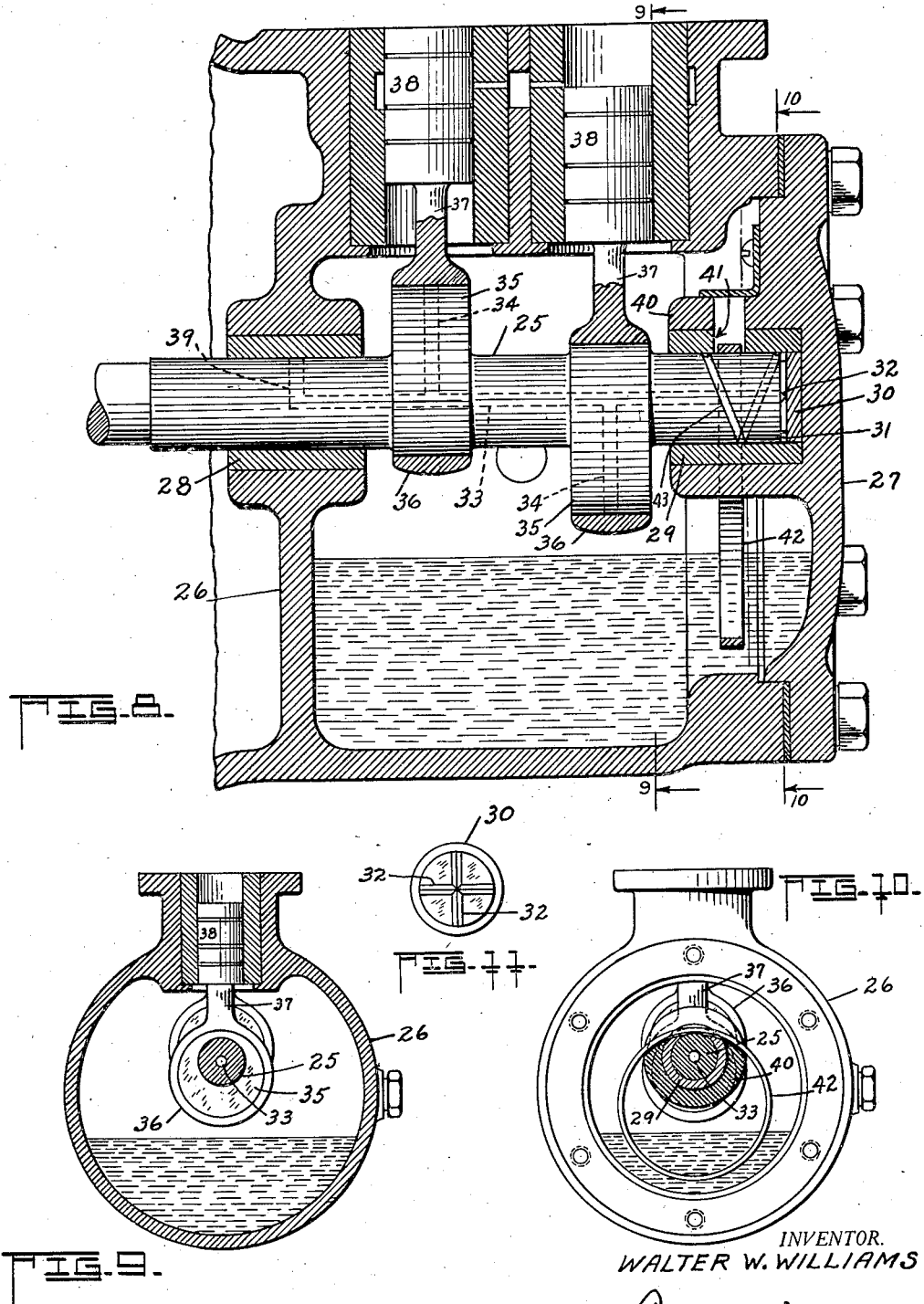
INVENTOR.
WALTER W. WILLIAMS
BY Langdon Moore
ATTORNEY.

Patented May 5, 1936

2,039,469

UNITED STATES PATENT OFFICE 2,039,469

LUBRICATING SYSTEM

Walter W. Williams, Bloomington, Ill.

Application June 11, 1934, Serial No. 730,021

1 Claim. (Cl. 308—168)

This invention relates to improvements in lubricating systems and more particularly to a means for lubricating shaft bearings.

It is an object of this invention to provide a simple and efficient means for lubricating the bearings of shafts which may be accomplished in a simple and efficient manner with but slight changes to the customary construction.

With these and other objects in view, reference is made to the accompanying sheets of drawings which illustrate preferred forms of this invention with the understanding that minor detail changes may be made therein without departing from the scope thereof.

In the drawings:

Figure 1 is a view in central, vertical section through a motor and motor casing in which the motor shaft is mounted vertically, with parts shown in elevation.

Figure 2 is a view in central, vertical section of the stationary bearing member shown in Figure 1.

Figure 3 is a top plan view of Figure 2.

Figure 4 is a fragmentary detail view of a somewhat modified construction in central, vertical section of the motor shaft stationary bearing member and motor casing.

Figure 5 is a view similar to Figure 4 of another type illustrating the stationary bearing member in elevation.

Figure 6 is a view similar to Figure 5 of a modified form.

Figure 7 is a top plan view of the bearing plate illustrated in Figure 6.

Figure 8 is a view in central, vertical section of the crank casing and cylinders of a reciprocating piston pump or compressor illustrating a modification of this invention and illustrating the pistons and crank shaft in elevation.

Figure 9 is a view of reduced size in section taken on the line 9—9 of Figure 8, looking in the direction of the arrows.

Figure 10 is a sectional view similar to Figure 9 taken on the line 10—10 of Figure 8, looking in the direction of the arrows.

Figure 11 is a detail view in elevation illustrating the end bearing plate of the shaft.

Figure 1 illustrates an application of this invention to an electric motor in which the rotor 1 is carried upon the vertical shaft 2 and contained within the casing 3. In the embodiment illustrated, the motor shaft 2 extends above the casing 3 and mounts a fan casing 4, whereby the fan is rotated by the operation of the motor. As customary in motors of this general type, the motor shaft 2 is recessed upon the under side and rotates about a bearing pin 5 rigidly mounted in the bottom of the casing 3. The casing at this point is provided with a lubricant chamber 6 above the bottom of the casing and into which the motor shaft and contained fixed bearing enter. The lubricating chamber is connected by a pipe 7 to a source of lubrication.

In accordance with this invention, the bearing pin 5 is provided with an external spiral groove 8 extending from the bottom of the lubricant chamber to the top of said pin. The bearing pin 5 is terminated short of the recess 9 in the shaft 2, which recess is preferably terminated in a conical end 10. The upper extremity of the bearing pin 5 is provided with an axial recess 11 which receives a ball 12 of greater diameter, which ball contacts upon the side opposite the bearing pin with a bearing disc 13 of a diameter to be received within the recess 9 of the shaft and bear against the conical end of said recess.

The rotation of the motor shaft about the fixed bearing pin will cause the lubricant in chamber 6 to travel upwardly through the spiral groove 8 into the chamber formed between the top of the bearing pin and the bearing disc 13 and lubricate the bearing. It is preferable to provide the top of the bearing pin 5 with a plurality of grooves 14 which will allow the lubricant to pass under the ball 12 and into the recess 11. The bottom of the recess 11 opens into an axial bore or passage 15 within the fixed bearing pin. The bottom of the passage 15 communicates with transverse passage 16 passing through the fixed bearing pin and communicating with the lubricant chamber 6. By this means, the lubricant carried upward by the groove 8 not only lubricates the bearing of the shaft 2 upon the fixed bearing member 5, but also returns the lubricant collected in the chamber between the top of the fixed bearing 5 and the bearing disc 13 through the passages 15 and 16 to the lubricant chamber 6.

Figure 4 illustrates a modification of this general construction. In this case, the upper end of the fixed bearing pin 5 is fashioned in the form of a truncated cone 17 with the upper flat surface contacting the bearing plate 13 and is provided with a transverse passage 18 communicating with the chamber formed between the bearing disc 13 and fixed bearing pin 5 and the axial passage 15 within the said fixed member. The lower end of this passage communicates with the transverse passage 16 communicating with the lubricant chamber 6. In this form, it is preferred to increase the lower portion of the passage 15 by counter-boring the lower end of the bearing pin 5 to provide a chamber 19 and an annular shoulder 20. A ball 12ᵃ is seated upon the shoulder 20 by a spring 21, the tension of which may be regulated by a plug 22 threaded into the lower end of the counter-bore bearing pin 5.

By this means, the lubricant conveyed by the spiral groove 8 collects in the chamber between the frustro-conical end of the fixed bearing pin 5 and bearing disc 13, and is returned through the passages 18, 15 and 16 to the lubricant chamber 6. By proper adjustment of the spring 21, the ball 12ᵃ remains seated until sufficient lubricant has collected in the upper chamber to lubricate the contacting parts of the bearing pin 5 and bearing disc 13 before the ball is unseated to return the lubricant to the chamber 6.

Figure 5 illustrates a construction similar to that shown in Figure 1 in which the passages 15 and 16 have been omitted.

Figure 6 illustrates a construction similar to Figure 5 in which a bearing plate 13ᵃ is substituted for the bearing disc 13 having semicircular cutaway peripheral apertures 13ᵇ and the motor shaft 2 is provided with one or more relief passageways 23 communicating with an axial passageway 24 opening into the conical chamber formed by the walls 10 at the end of the recess 9. The relief passageway 23 allows an excess pressure accumulating in the lubricant delivered about the ball 12 to pass excess lubricant between the cutaway portions 13ᵇ of the bearing disc 13ᵃ and through the axial passage 24 to the exterior of the shaft 2 through passageway 23.

Figure 8 illustrates an embodiment of this invention in connection with the horizontal crank shaft 25 of a pump or compressor, including a crank casing 26 having a removable end closure 27 in which the shaft 25 is mounted in a bearing 28 mounted in the wall of the crank chamber 26 and a bearing 29 mounted in the closure 27.

A shouldered bearing plate 30 is mounted within the bearing 29 in contact with the end closure 27 and the end of the shaft 25 bears against the reduced portion of the plate 30 forming an annular chamber 31 thereabout. The bearing face of the reduced portion of the plate 30 is provided with a plurality of radial grooves 32 communicating with the annular chamber 31. The shaft 25 is provided with an axial bore 33 communicating with the junction of the grooves 32 on the bearing plate 30. The axial bore 33 is intersected by bores 34 in the cranks 35 extending to the surface about which the eccentric straps 36 of the connecting rods 37 of the pistons 38 are mounted and is terminated in a radial bore 39 opening to wipe over the central portion of the bearing 28.

The upper portion of the bearing 29 and surrounding boss 40 of the closure plate 27 are cut away to form a wall 41 adapted to receive a metallic ring 42 of sufficient diameter to be supported with its inner surface in engagement with the exterior of the shaft 25, so as to be rotated thereby, and to have its lower portion submerged within the lubricant contained in the crank case 26. The end of the shaft within the bearing 29 is provided with an external spiral groove 43 passing under the ring 42 and communicating with the annular chamber 31 at the end of the shaft 25.

In this form, the rotation of the shaft 25 causes the ring 42 to rotate through and carry over lubricant from the crank case to the shaft 25 and the lubricant is passed through the spiral groove 43 to the annular chamber 31 and from thence through the radial grooves 32 to the axial bore 33 and from there through the radial bores 34 and 39 to lubricate the bearings of the eccentric straps 36 and the shaft bearing 28.

The lubricant thereafter is faced or allowed to exude from the bearing and return to the bath of lubricant contained in the crank case.

What I claim is:

A lubricating system for bearings having a recessed movable part adapted to snugly receive and rotate about a stationary part, the bottom of the recess forming a chamber above the top of the stationary part, a bearing interposed between the said parts within the chamber, a bath of lubricant, means actuated by the moving part cooperating with the stationary part for carrying lubricant from the bath to the chamber including a spiral groove upon the exterior of the stationary part, and an axial bore in the stationary part returning the lubricant from the chamber to the bath, and an adjustable check valve regulating the pressure within the chamber before allowing the lubricant to return to the bath.

WALTER W. WILLIAMS.